(12) United States Patent
Carvalho et al.

(10) Patent No.: US 12,014,303 B2
(45) Date of Patent: Jun. 18, 2024

(54) CURBSIDE BRANCH OPTIMIZATION

(71) Applicant: The Toronto-Dominion Bank, Toronto (CA)

(72) Inventors: Darren Michael Carvalho, Toronto (CA); Shania Xian Yu Fu, Markham (CA); Jordan Ross Stirling, Waterloo (CA); Jinoj Titus, Oshawa (CA)

(73) Assignee: The Toronto-Dominion Bank

( * ) Notice: Subject to any disclaimer, the term of this patent is extended or adjusted under 35 U.S.C. 154(b) by 551 days.

(21) Appl. No.: 16/582,368

(22) Filed: Sep. 25, 2019

(65) Prior Publication Data

US 2021/0089986 A1    Mar. 25, 2021

(51) Int. Cl.
| | |
|---|---|
| G06Q 10/0631 | (2023.01) |
| G07F 19/00 | (2006.01) |
| H04W 4/021 | (2018.01) |
| H04W 4/029 | (2018.01) |
| H04W 4/30 | (2018.01) |

(52) U.S. Cl.
CPC ..... *G06Q 10/06315* (2013.01); *G07F 19/209* (2013.01); *H04W 4/021* (2013.01); *H04W 4/029* (2018.02); *H04W 4/30* (2018.02)

(58) Field of Classification Search
None
See application file for complete search history.

(56) References Cited

U.S. PATENT DOCUMENTS

| | | |
|---|---|---|
| 7,171,470 B2 | 1/2007 | Doyle et al. |
| 7,991,800 B2 | 8/2011 | Lawrence et al. |
| 8,860,587 B2 | 10/2014 | Nordstrom |
| 8,909,771 B2 | 12/2014 | Heath |
| 9,165,304 B2 | 10/2015 | Weiss et al. |

(Continued)

FOREIGN PATENT DOCUMENTS

| | | | | |
|---|---|---|---|---|
| CA | 2953750 A1 | * | 7/2017 | ......... G06Q 30/0206 |

OTHER PUBLICATIONS

Bin Guo et al., Harnessing the Power of the General Public for Crowdsourced Business Intelligence: A Survey, IEEE Access, vol. 7, 2019 (Year: 2019).*

(Continued)

*Primary Examiner* — Jerry O'Connor
*Assistant Examiner* — Matthew H Divelbiss
(74) *Attorney, Agent, or Firm* — Fish & Richardson P.C.

(57) ABSTRACT

The present disclosure involves, systems, software, and computer-implemented methods for determining a location for a curbside branch. One example system comprises a memory storing instructions; at least one hardware processor interoperably coupled with the memory, wherein the instructions instruct the at least one hardware processor to: obtain historical and current exchange data of users associated with a particular location; obtain external data about the particular location; enrich the historical and current exchange data with the external data; identify one or more analysis rules to apply to the enriched data to determine an estimated demand for services associated with deployment of a mobile site at the particular location; compare estimated demand to a predetermined threshold; and in response to a determination that the estimated demand exceeds the predetermined threshold, identify the particular location for mobile site deployment.

20 Claims, 9 Drawing Sheets

(56) References Cited

U.S. PATENT DOCUMENTS

| | | |
|---|---|---|
| 2003/0033195 A1 | 2/2003 | Bruce et al. |
| 2005/0228707 A1 | 10/2005 | Hendrickson |
| 2008/0172281 A1 | 7/2008 | Probst |
| 2011/0099046 A1* | 4/2011 | Weiss ................. G06Q 30/0202 705/7.31 |
| 2013/0197949 A1* | 8/2013 | Dermer ................. G06Q 10/02 705/5 |
| 2016/0328669 A1 | 10/2016 | Droege |
| 2017/0098181 A1 | 4/2017 | Herman et al. |
| 2017/0124464 A1 | 5/2017 | Crabtree et al. |
| 2018/0158322 A1 | 6/2018 | McDonnell et al. |
| 2018/0276695 A1 | 9/2018 | Dione |
| 2019/0034966 A1* | 1/2019 | Zaheer ............... G06Q 30/0261 |
| 2019/0171833 A1 | 6/2019 | Zhang et al. |

OTHER PUBLICATIONS

PNC Bank "PNC Bank's First-Ever "Pop-Up Branch" Debuts in Atlanta," PR Newswire, Dow Jones & Company, Inc., retrieved from URL <https://www.prnewswire.com/news-releases/pnc-banks-first-ever-pop-up-branch-debuts-in-atlanta-217905721.html>, Aug. 1, 2013, 3 pages.

* cited by examiner

CURBSIDE BRANCH OPTIMIZATION

BACKGROUND

A curbside branch is a secure truck that provides a cost-effective way to improve market presence with a convenient walk-in experience, while offering the same level of comfortable services as a physical branch. The curbside branch can provide ATM services, as well as general banking services, complete with one or more tellers to assist in financial and banking transactions.

SUMMARY

The present disclosure involves systems, software, and computer-implemented methods for determining a location for a curbside branch. An example system comprises: a memory storing instructions; at least one hardware processor interoperably coupled with the memory, wherein the instructions instruct the at least one hardware processor to: obtain historical and current exchange data of users associated with a particular location; obtain external data about the particular location; enrich the historical and current exchange data with the external data; identify one or more analysis rules to apply to the enriched data to determine an estimated demand for services associated with deployment of a mobile site at the particular location; compare estimated demand to a predetermined threshold; and in response to a determination that the estimated demand exceeds the predetermined threshold, identify the particular location for mobile site deployment.

In some implementations, the instructions further instruct the at least one hardware processor to generate notifications associated with the mobile site deployment and transmit the notifications to a set of users. In some implementations, the historical and current exchange data comprises financial exchange data and user location data. In some implementations, the historical and current exchange data comprises customer density at the particular location, data exchanges performed by customers within an area surrounding the particular location, mobile location data, and interactions with financial institutions.

In some implementations, the external data comprises information associated with population and population density at various times. In some implementations, the external data comprises at least one of demographic data, commute-related information, seasonal information, local information, event information, and geo-location-related information. In some implementations, the external data comprises information about residents and persons who visit an area surrounding the particular location, work hours in the area surrounding the particular location, income and education information about persons in the area surrounding the particular location, event information in the area surrounding the particular area surrounding the particular location; weather information in the area surrounding the particular area surrounding the particular location, and market conditions; information about residents and persons who visit an area surrounding the particular location, work hours in the area surrounding the particular location, income and education information about persons in the area surrounding the particular location, event information in the area surrounding the particular area surrounding the particular location; weather information in the area surrounding the particular area surrounding the particular location, and market conditions.

In some implementations, the one or more analysis rules is selected from a group consisting of machine learning rules and neural network based rules. In some implementations, applying the one or more analysis rules comprises performing person analysis, event analysis, and density analysis.

In some implementations, the instructions further instruct the at least one hardware processor to cause the mobile site to be automatically dispatched.

In some implementations, the instructions further instruct the at least one hardware processor to modify hours of operation for the mobile site based on updated or analyzed information.

In some implementations, the threshold demand is a predetermined value. In some implementations, the threshold demand is dynamically defined to determine when a mobile site is to be deployable.

In some implementations, identifying the particular for mobile site deployment is further in response to a determination that a population density of the particular location exceeds a predetermined population density threshold. In some implementations, the instructions further instruct the at least one hardware processor to predict targeted services to be provided by the mobile site at the particular location based on demand information. In some implementations, the instructions further instruct the at least one hardware processor to determine a time period during which to deploy the mobile site based at least on the enriched historical and current exchange data.

The technical solutions described herein provide a number of benefits to financial institutions and their customers. As a business opportunity, the solution provides a reduced physical footprint of traditional brick-and-mortar locations while providing the same level of service in a timely manner and where it is needed. Additionally, the solution allows financial institutions to retain or even improve their market presence while reducing costs associated with traditional brick-and-mortar locations. The solution further provides for better targeting for upselling opportunities based on specific market and/or community demographics and data.

Using predictive analytics, the present solution can determine a predicted demand for a curbside branch, or mobile site, in particular locations based on various types of information to ensure a requisite demand is met for the location. If demand is met, then the curbside branch is deployed or scheduled for deployment. Customers can be alerted of the deployment through any suitable channel (e.g., mobile banking application, text message (e.g., SMS or MMS), email notifications, etc.) to allow for planned visits.

In some instances, the curbside branch will only be deployed after a predetermined number of customers indicate, via a response to the notification (or alternatively, a prediction confidence level based on habit or actions), that they will visit or are likely to visit the curbside branch. In this way, it can be determined that deployment of a curbside branch is justified by the actual or perceived demand.

Once deployed, further notifications can be sent to users. Appointments can be booked with the curbside branch in a manner similar to other branch banking appointments.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
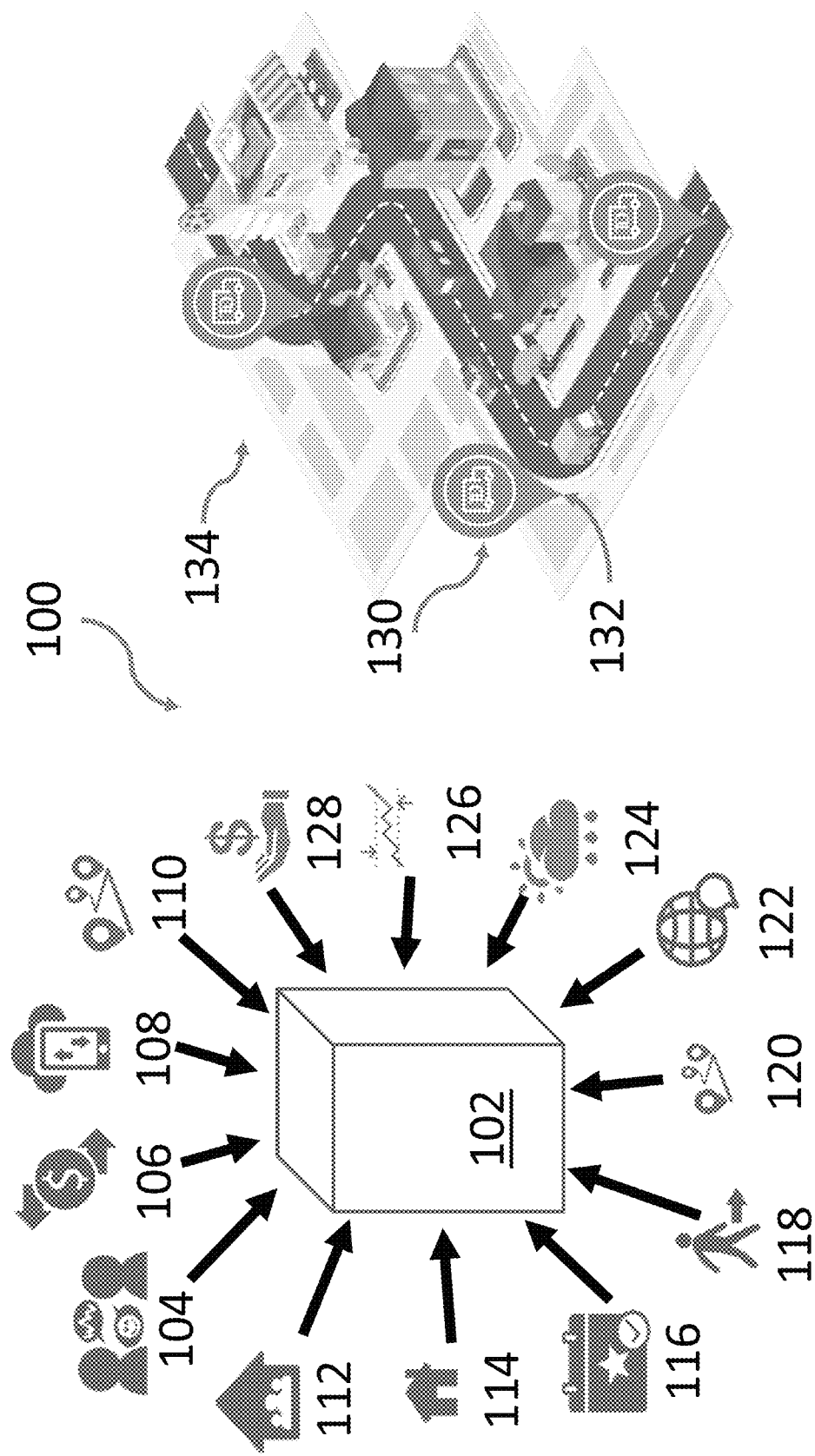
FIG. 1 is a conceptual diagram of a system for determining a location for a curbside branch.

In general, this document describes mechanisms for determining locations for curbside branches of financial institutions. A curbside branch is a secure truck or other vehicle that provides customers with access to services normally provided by brick-and-mortar locations of the financial institutions. Curbside branches can provide a cost-effective way to improve market presence with a convenient walk-in experience, while offering the same level of services as a physical brick-and-mortar branch. Curbside branches can be placed at various locations at different and limited times based on advanced predictive analytics, live analysis, and in response to consumer and location-related events and consumer needs. Further, curbside branches can make financial services available to different areas in need without requiring an upfront investment in infrastructure and location costs. Using the techniques described herein, particular deployment locations for curbside branches can be selected that best suit the needs of customers.

Currently, curbside branches are deployed during disasters to locations where no electricity or no banking options are available. Alternatively, curbside branches can be delivered to particular areas based on a pre-determined event, such as to supplement a sporting event, cover for a branch undergoing renovations, or elsewhere. Decisions for where to place or deploy a curbside branch are limited to static decisions, or in response to an event. No predictive analytics or considerations are performed prior to deploying the curbside branch.

Potential locations are determined based on customer demand—explicit and/or determined—for a curbside branch using information about financial transactions, or data exchanges, around the potential location and external information about the potential location, either independently or in comparison to one or more other locations. Various types of data can be used to make a determination about whether to deploy a curbside branch at a location. In some implementations, a financial institution may store information on and for a plurality of accounts, including customer demographics (e.g., age, sex, occupation, etc.), customer-specific transaction histories, and cards (or other payment instruments) issued to the customer. For example, historical and current transaction data (e.g., from customer accounts) may show, or allow to be derived, patterns of customer behavior that are indicative of demand for a curbside branch. Additionally, external data from one or more data sources may be used to enrich the historical and current transaction data, including both data sources managed by the financial institution, as well as other private and/or public third party data sources. Demographic information may include information about a population of people living, working, or moving around, through or near a particular location. Information about those persons may include income information, commuting patterns, population density at different times, and other information. Additionally, weather data can enrich the historical and current transaction data. For example, demand for a curbside branch would likely be higher in an area with a high population density and good weather as opposed to in a sparsely populated area during a snowstorm. This type of external information could help to supplement known information about a financial institution's customers and/or potential customers within a certain area of a location of a potential curbside branch.

In addition to determining whether a curbside branch should be deployed at a location, it may also be desirable to determine when it would be advantageous to deploy a curbside branch at a location, including over longer periods of time (e.g., which months of the year) or what hours of a day (e.g., during work hours or off-work hours). For example, if a high number of customers are located near a particular location during a particular period of time, such as during regular work hours (e.g., 9 AM to 5 PM), it may be desirable to deploy a curbside branch at that location during those hours. In that example, the number of customers located near that particular location may fall below a threshold amount after regular working hours (e.g., in the late evening or early morning hours), so that the particular location may not be a desirable location at which to deploy a curbside branch during those non-working hours. In some instances and depending on one or more other factors, the curbside branch may not be deployed to that location at all, or alternatively, may be deployed but only during normal working hours.

Other factors may affect desirable times in which to deploy a curbside branch. For example, while information from customer accounts may show high customer demand in a particular location, weather and climate in and around a location may affect the decision of whether to deploy a curbside location. For example, months of the year when the weather is typically cold and snowy may be poor for deployment of a curbside branch at a particular location because potential customers may not wish to travel (e.g., walk) outside. Similarly, rainy or hurricane seasons may also affect customer travel, causing otherwise attractive locations to become undesirable, so those times of year may be avoided for those types of locations.

Another external factor that may weigh in favor of deployment is the occurrence of special events around the location of the potential curbside branch. For example, sporting events, concerts, or state fairs are all events that result in high populations of people in an area, and in particular, high populations of pedestrian traffic. As such, an otherwise average location may be deemed to be more desirable for a curbside branch at a location during such a special event.

After a location is selected for curbside branch deployment, the financial institution with which the curbside branch is associated may notify customers in the area surrounding the location to inform them of the upcoming deployment. Any number of suitable channels of communication can be used, such as notifications in a mobile application associated with the financial institution, text messages or e-mail messages to phone numbers and email accounts associated with customer accounts, through targeted and/or location-based marketing, and the like. Additionally, after the curbside branch is deployed, further notifications may be sent to customers. For example, as a customer logs into the mobile application associated with the financial institution, that customer will be shown the nearest location where there is a physical or a curbside branch. The mobile application may also notify customers on the home screens of their mobile devices, if the customer has opted into such notifications.

Turning to the illustrated example implementation, FIG. 1 shows a conceptual diagram of a system 100 for determining a location for a curbside branch. A computing device 102 is provided that obtains and processes information. While only one computing device 102 is shown in FIG. 1, any number of computing devices at any number of locations may be used. In order to make a determination about a placing a curbside branch 130 at a particular location 132, the computing device 102 obtains historical and current transaction data 104, 106, 108, 110 and external data 112, 114, 116, 118, 120, 122, 124, 126, 128 about an area 134 surrounding the particular location from any number of internal or external sources (not shown).

In some implementations, the historical and current transaction data is maintained by a financial institution. This information may be provided to the computing device 102 either in real-time or in batches. The historical and current transaction data may be maintained in customer accounts and include information such as age, sex, occupation, income, transaction history, and the like.

In some implementations, the external data may be provided to the computing device 102 from one or more third party sources, providing information such as census data, weather reports, traffic reports, event calendars, and the like.

The historical and current transaction data 104, 106, 108, 110 may include various types of information, such as information about customer interactions 104, information about customer transactions 106, mobile data 108, and geo-location-related data 110. Customer transaction information 106 can include current and historical transactions (e.g., financial transactions) that customers in the area have performed, including the types of transactions, the frequency of the transactions, and the times at which the transactions occurred. Mobile data 108 can include information about customer location, population information, and density information. Additionally, the mobile data 108 may include information relating to the timing of the population and density, which may be particularly use in locations where the population is largely transitory. In those types of locations, it may be desirable to deploy a curbside branch only during times when the largely transitory population is highest. Geo-location-related data 110 may be obtained from third party systems (e.g., app-based ride share services, data from online housing rental marketplaces) and provide information about customers (or non-customers).

The external data 112, 114, 116, 118, 120, 122, 124, 126, 128 may include various types of information, such as information about families, households, and marital status 112; housing-related information 114; information about seasonal or local events 116; information about immigration and ethnocultural diversity 118; information about people's commutes to work 120, information about dominant languages used at home or at work 122, weather-related information 124, information about market conditions 126, and income band information 128.

The external data 112 can provide information about residents and other persons who visit an area. The external data 112 can also include information about the timing of the particular data, which is particularly useful in areas with transitory populations. Information about people's commutes to work 120 may include information about the work hours in the area 134 and density change and commuting information. Additionally, the mode of transportation used by people in the area to commute to work, such as mass transit (train, bus), car or carpool, walking, may also be used. Locations where people are commonly dropped off for work, or otherwise exit or end the commute, may further be used. Commute times and patterns (e.g., hourly, daily, month, etc.) and population and population density at certain hours may also be helpful external data.

Income band information 128 can include the income range of the population of the area, including the distribution of income across the population. Additionally, education information (e.g., highest level of education completed) for people in the area may also be used.

Information about seasonal or local events 116 may provide useful information to determine customer demand. For example, the occurrence of a sporting event or popular concert may temporarily increase the population of an area during the hours of the sporting event of concert. Similarly, weather-related information 124 can also be used to determine customer demand. Bad weather conditions may convince people to stay home even if a sporting event is scheduled to occur, thus decreasing the temporary population in the area. As shown in that example, particular combinations of event information and weather information can be helpful to ascertain the likelihood of customer demand at a location at certain times.

Information about dominant languages used at home or at work 122 can be used to determine what language(s) to provide services in at a curbside branch. For example, if both English and Spanish are dominant languages in a particular area, it would be desirable to include both English- and Spanish-speaking employees and/or English and Spanish written materials for customers to facilitate services rendered at the curbside branch.

Information about market conditions 126 may include information about market volatility and the health of the local market. For example, in a down market, demand for services related to particular financial services (e.g., withdrawals or deposits) may decrease as a result of an overall decrease in spending or earning. However, other services (e.g., requests for increased credit limits or borrowing) may increase in a down market. Similarly, in a booming market, demand for spending-related services may increase.

Figure 2:
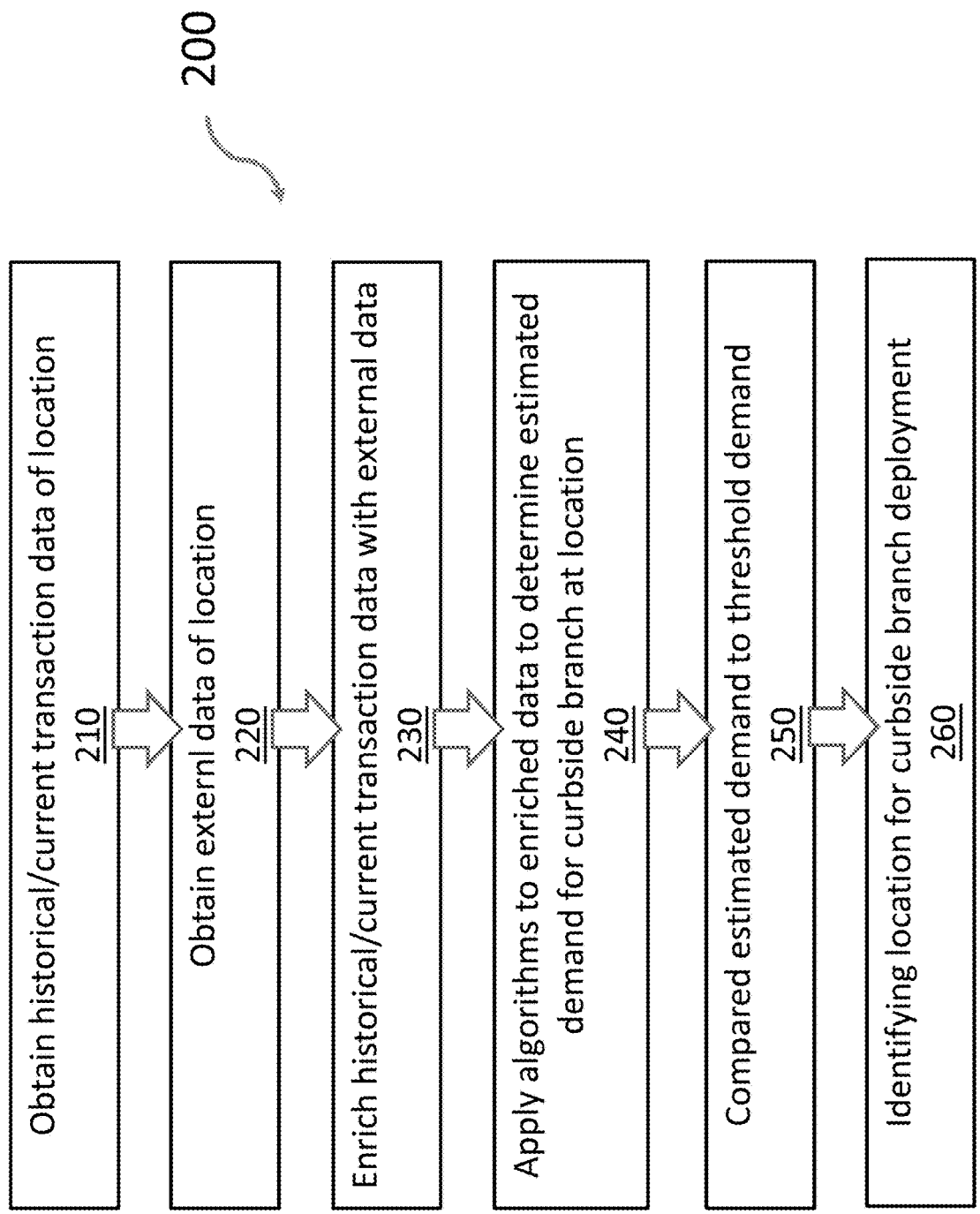
FIG. 2 is a flow chart of a method for determining a location for a curbside branch.

The computing devices 102 collectively uses the historical and current transaction data 104, 106, 108, 110 and external data 112, 114, 116, 118, 120, 122, 124, 126, 128, for example, according to the method of FIG. 2, to determine whether a curbside branch 130 should be deployed at a particular location 132. This data (and additional data) may be further updated and analyzed, for example, to modify the hours of a curbside branch or to modify plans for a future curbside branch before it is deployed.

FIG. 2 is a flow chart of a method 200 for determining a location for a curbside branch. In order to determine whether a particular location is desirable for a curbside branch, customer demand at that location is predicted based on multiple factors. The method may consider data from an entire geographical region and provide predictions to determine the locations within the region in which to deploy a curbside branch. At step 210, historical and current transaction data of users associated with a particular location is obtained. The historical and current transaction data can provide information about the customer density at or around the location. The historical and current transaction data may be obtained from any suitable source, including information from the financial institution and mobile applications (e.g., mobile applications relating to the financial institution or applications providing an indication of users' locations). The historical and current transaction may include various types of information about the location or an area surrounding the location, including customer interactions, information about customer transactions, mobile data, and geo-location-related data, as discussed above.

At step 220, external data about the particular location is obtained. The external data may be obtained from any suitable source, including local census information or third party servers that contain local demographic information. The external data may include various types of information about the location or an area surrounding the location, including information about families, households, and marital status; housing-related information; information about seasonal or local events; information about immigration and ethnocultural diversity; information about people's commutes to work, information about dominant languages used at home or at work, weather-related information, information about market conditions, and income band information, as discussed above.

In general, information from customers and non-customers may be obtained through any suitable source. Population and density information provide an indication of the number of people located in a particular area and how many of those people are active uses of particular services. The information may further be predicted or based on real-time location information (e.g., based on normal levels, based on current levels). In order to protect the security and privacy of customers and non-customers, information may be anonymized. For example, information relating to particular transactions (e.g., financial transactions, such as payments) associated with a location may be collected to identify higher than normal transactions. Such information may be anonymized so as not to identify the particular customer involved in the transaction. Similarly, information relating to interactions with Internet of Things (IoT) devices, turnstile movement over a period of time, and a number of active users, for example, may be similarly anonymized.

At step 230, the historical and current transaction data is enriched with the external data. In some implementations, enriching the historical and current transaction data comprises merging the historical and current transaction data with the external data. Enriching the historical and current transaction data allows the system to obtain a 360° view of customers and the demographics of a region. In particular, while historical and current transaction data, such as information from customer accounts, may be helpful in determining customer demand, it does not take into account other external factors that may ultimately affect customer demand for a curbside branch. Such external factors include weather, traffic, demographics of the entire population of the location, and seasonal or local events near the location.

For example, for a particular location, historical and current transaction data may suggest high customer demand for a particular location (e.g., showing a high number of customers in the area who typically perform a lot of transactions at branches of the financial institution), but that data does not take into account weather data at those historical times. If the forecast for the week shows rainstorms from Monday through Wednesday and clear skies on Thursday and Friday, the system can enrich the historical and current transaction data showing high customer demand for a curbside branch at a particular location with weather information indicating that the particular location is a good candidate for a curbside branch on Thursday and Friday but not on Monday, Tuesday, or Wednesday. Information about the particular impact certain weather patterns or types may cause can be used to adapt and enrich the historical data.

In another example, a particular location that has historical and current transaction data that suggests high customer demand may be enriched with information showing a high population of commuters who travel by car who spend very little time walking outside and an overall low population of pedestrians. As a result, the historical and current transaction may be enriched with external data to determine that demand for a curbside branch at that particular location may be lower than expected due to a low population of pedestrians.

In yet another example, for a particular location, historical and current transaction data may suggest low customer demand for a particular location (e.g., showing a low number of customers in the area who typically do not perform many transactions at branches of the financial institution). However, external data may reveal additional factors that show the likelihood of an increase in customer demand. For example, external data may reveal that a popular state fair is schedule to occur from August 22 to September 2, resulting in a significantly higher-than-normal population of people at or near the location. As such, the demand for a curbside branch at that location is likely much higher than suggested by the historical and current transaction data alone. In some instances, historical data coinciding with such an event or similar events can be used to adjust or modify the expected demand.

In this same example where historical and current transaction data may suggest low customer demand for a location, external data may suggest higher than otherwise-expected customer demand. For example, the location may be near a baseball stadium, so the overall population near the location may be higher during the baseball season from April to September than from October to March, so the system may determine that the location is a good candidate for deployment of a curbside branch only during the months of April to September, and particularly on days coinciding with a home game or event at the nearby stadium. The system may similarly adjust for dates of other highly-attended sporting and entertainment events.

Moreover, if external data review indicates that a popular cultural event for those with a Hispanic background is scheduled to occur during particular week, that external data may be used to further determine that a curbside branch should be deployed and that customer representatives and services should be provided in both English and Spanish.

In some implementations, enriching the historical and current transaction data with the external data comprises identifying all data from all datasets and merging the raw data as well as derived insights to obtain a holistic view of customers and of the geographical demographics of a region.

Enrichment of the historical and current transaction data may involve quantifying each of the types of data to generate an overall score based on a combination of the historical and current transaction data and the external data.

At step 240, one or more algorithms are applied to the enriched data to determine an estimated demand for services associated with deployment of a curbside branch at the particular location. The algorithms may be models, or one or more analysis rules, that are generated based on model training, evaluation, tuning, and testing. The method may further include identifying the one or more algorithms to be applied. Selection of an algorithm may involve one or more steps. First, an understanding of a desired outcome is identified. These outcomes may include, for example, a classification, a binary outcome, a logistic outcome, bucketing, or the like. Second, multiple models may be cross-validated to determine which model or models obtains the best precision and accuracy across testing and/or training sets. Next, hyperparameters (e.g., static parameters) are tuned to tweak learning rates, gradients, and other internal mathematical parameters within a model to yield the optimal accuracy. Then, accuracy tests are performed on a plurality of models to identify that model that performs the best on new data. For example, a confusion matrix may be used to determine the results for false positives, false negatives, true positives, and true negatives.

Example algorithms that may be applied include machine-learning and neural network algorithms. The algorithms may further be applied to analyze the data to predict demand for particular services at a location by analyzing persons, events, and density at or around the location. In some implementations, machine-learning models are continuously monitored to ensure accuracy, precision, and sensitivity. In some implementations, neural networks used are continuously monitored to ensure that the learning rates are controlled in such a way that yield the most optimal response to serve customers.

For example, a neural network may be used that mimics the activity to a population based on historical information and generate a prediction. A neural network is a graph of neurons. A neuron has inputs and outputs. Similarly, a neural network has inputs and outputs. The inputs and outputs of a neural network are represented by input neurons and output neurons. Input neurons have no predecessor neurons, but do have an output. Similarly, an output neuron has no successor neuron, but does have inputs. A neural network consists of connections, each connection transferring the output of a neuron to the input of another neuron. Each connection is assigned a weight. A propagation function is used to compute the input of a neuron from the outputs of predecessor neurons. The propagation function is leveraged during the forward propagation stage of training. A learning rule is a function that modifies the weights of the connections. This serves to produce a favored output for a given input for the neural network. The learning rule is leveraged during the backward propagation stage of training.

Such a neural network can learn to recognize patterns in digital representations of sounds, images, and data. In some implementations using a neural network use deep learning, which involves a large amount of matrix operations that can be massively paralleled. Furthermore, the success or failures of prior predictions may be used to provide additional learning. An example of such a neural network is the TensorFlow Neural Network.

In some implementations, one or more characteristics of the data may be identified. The one or more characteristics may be statistically derived using machine learning algorithms.

In some implementations, the algorithms may be used to provide binary predictions for each customer and the customer's particular habits in order to best determine whether a particular location is a good candidate for a curbside branch. Moreover, Flybits data may be used to ascertain the geographical movement of customers and their transactional data.

At step 250, the estimated demand is compared to a threshold demand. The demand threshold may be statically and/or dynamically defined in order to determine when a curbside branch should be deployed. For example, customer demand may need to reach a certain level with a particular population density in order for a location to be identified as a location for a curbside branch.

Requirements for meeting a threshold demand may shift. For example, if a particular area has a low population density but a particularly high customer demand, a location may nonetheless be identified as a location for a curbside branch. Similarly, if an area has a high population density but a low per capita demand, a location may nonetheless be identified as a location for a curbside branch. In these implementations, the estimated demand may be calculated as an aggregate score based on several individual factors. The aggregate score may be calculated as either the sum or an average of other individual scores, where the individual scores are associated with a comparison related to a particular factor.

For example, in a scenario where an aggregate score is calculated as an average of two individual scores, a threshold score of 100 may be required. The factors of population density and per capita demand may be considered. A particular location may have a high population density that is 30% above a threshold population density but a per capita demand that is 10% below a threshold per capita demand. In this example, the location is determined as having an aggregate score of 110 (e.g., with a population density score of 130 and a per capita demand score of 90). It is also possible to weight certain factors more heavily than other factors where determining the estimated demand (e.g., aggregate score).

At step 260, in response to a determination that the estimated demand exceeds the threshold demand, the particular location is identified as a location for curbside branch deployment. After a particular location is identified as a location for deployment of a curbside branch, deployment may occur automatically or may require authorization (e.g., by a manager).

Additionally, notifications or instructions for deployment of the curbside branch may be sent to one or more parties. In some implementations, further approval may be needed (e.g., by a manager) after a particular location is identified before deployment of the curbside branch. In some implementations, after a location is identified as a location for curbside branch deployment, notifications or instructions are automatically transmitted, for example, to a central location in order to implement the deployment.

Optionally, after a particular location is identified as a location for deployment of a curbside branch, notifications may be sent out to customers in the area around the location to inform them about the curbside branch. Notifications may be first generated when a particular location is identified for a curbside branch. Various types of notifications may be possible, such as announcements of available curbside branches, recommendations to visit a particular curbside branch a customer is near an already-deployed curbside branch, and recommendations to visit a particular curbside branch if a customer is likely to be near a branch that will be or is deployed.

Figures 3A, 3B, 3C:
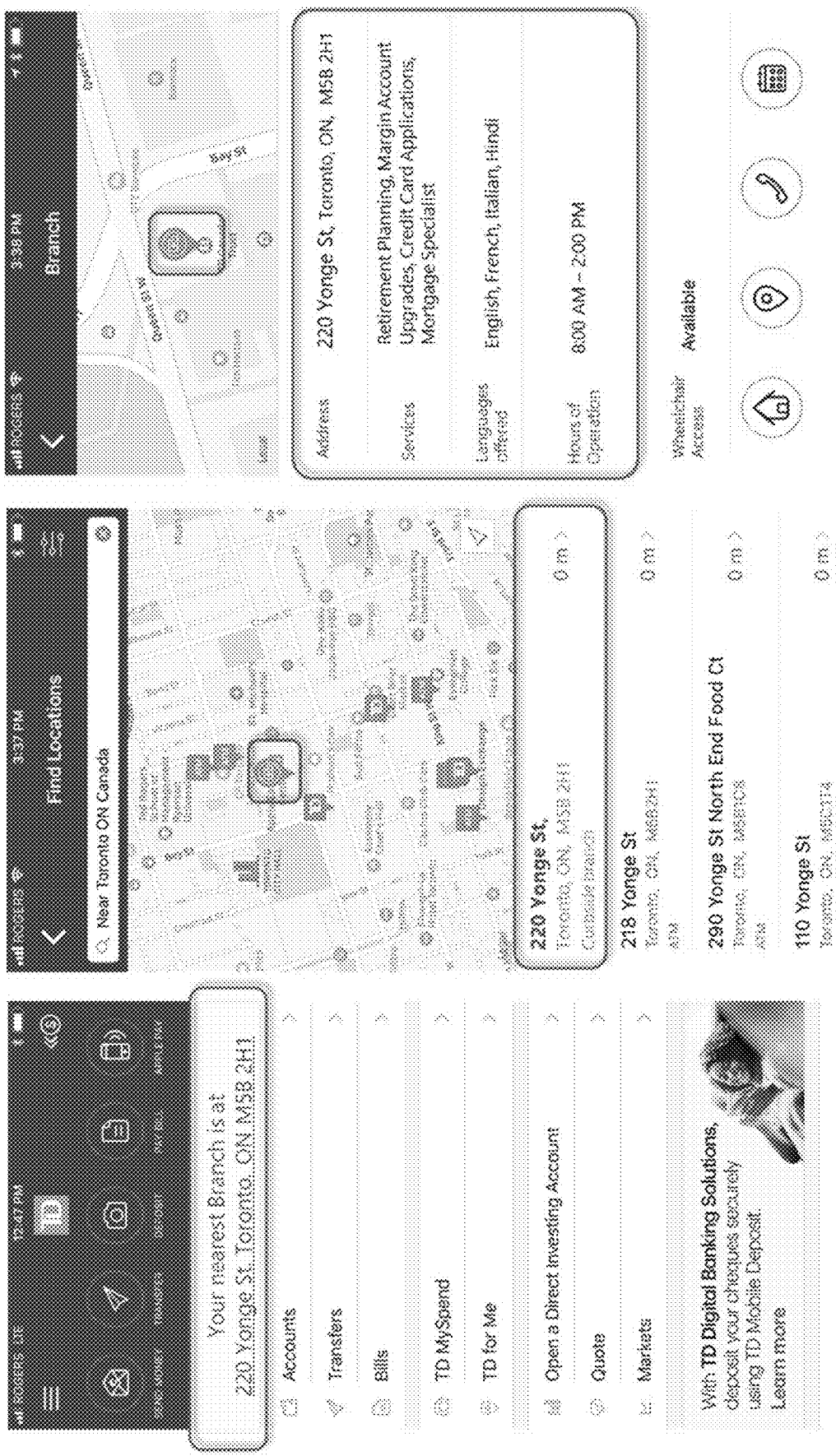
FIG. 3A shows a user interface on a mobile application displaying the address of the curbside branch.
FIG. 3B shows a user interface on the mobile application displaying the location of the curbside branch in a map.
FIG. 3C shows the details of the curbside branch.

In some implementations, based on account analysis and on a determination that a customer is near a deployed curbside branch, a trigger notification may be sent to the customer, which may include, for example, a recommended action. For example, the trigger notification may inform a customer about a nearby curbside branch and recommend that the customer use a particular service that is featured at the nearby curbside branch. In some implementations, a mobile application associated with the financial institution deploying the curbside branch may show users where curbside branches are located in a particular area, as shown in FIGS. 3A-3C. FIG. 3A shows a user interface on a mobile application displaying the address of the curbside branch nearest to a user's location. In some implementations, when a user opens the mobile application, the application displays, in a section of a user interface in the application, the closest branch for the financial institution, whether it is a curbside branch or not. FIG. 3B shows a user interface on the mobile application displaying the location of the curbside branch nearest to the user's location in a map. Other curbside branches are also listed and displayed on the map. In some implementations, when a user searches for the closest branch in the mobile application, the map will refresh and display all of the closest nearby locations with curbside branches by showing a particular icon that indicates that a curbside branch is located at that spot. For example, an icon of a truck may be used to designate the location of a curbside branch. A different icon (e.g., a building, or logo for the financial institution) may be used to designate the location of a brick-and-mortar branch. FIG. 3C shows the details of the curbside branch located closest to the user's location. The details of the curbside branch show its location on a map, the address of the curbside branch, the services offered at the curbside branch, the languages offered at that curbside branch, the hours of operation, and accessibility information about that curbside branch. Other information about the curbside branch, such as availability of parking, a phone number associated with the curbside branch, and necessity of an appointment, may also be provided. In some implementations, if a user selects a location on the map, the application will show greater detail about the location, such as the address, distance from the user, whether the branch is a curbside branch or a brick-and-mortar branch, the languages offered at that curbside branch, hours, etc.

In some implementations, notifications are sent to customers when they enter a predefined area around the location of the curbside branch, or when they are predicted to enter the predefined area. Notifications may be sent to users based on determined interest. For example, notifications may be sent to users who have previously indicated an interested in particular services provided by the curbside branch.

After a location is selected for a curbside branch, various operational decisions may be required. Some operational decisions may be made daily, such as predicting customer demand for particular hours or predicting targeting services for the curbside branch.

Predicting customer demand for particular hours may be based on prior customer interactions or external data, as described above. For example, if working hours of the population around the curbside branch location are known, the hours of operation for the curbside branch may be adjusted to accommodate those hours. In another example, if on a first day, 75% of customers visited the curbside branch between 9 AM to noon, and 25% of customers visited the curbside branch between noon and 3 PM, the hours of operation of that curbside branch may be adjusted on the second day to 7 AM to 1 PM to accommodate the greater population of customers who visited the curbside branch in the morning hours.

Services to be provided at the curbside branch may be determined, generally or for a given period of time (e.g., for a day). Services provide may also be based on prior customer interactions or external data, as described above. In some implementations, the targeted services for that location may be predicted using one or more thresholds in demand for particular services.

Other operational decisions may be made intra-daily (i.e., during the day). In these implementations, one or more of current transaction data or external data may be received, and the data may be further analyzed to determine an updated estimated demand. The updated estimated demand may be compared to a threshold demand, which may be the same threshold demand value used to identify the location for curbside branch deployment or it may be based on other factors (e.g., the capacity of the deployed curbside branch). Based on this comparison, one or more characteristics of the deployed curbside branch may be adjusted. For example, the size of curbside branch may be adjusted during the day based on customer interactions. In cases where a curbside branch requires resizing, it may be appropriate to add or reduce staff working at the curbside branch, or even to replace a curbside branch of one size (e.g., physical size) with another smaller or larger one. Similarly, services available at a particular curbside branch may be reconfigured on an intra-daily basis based on customer demand. These intra-daily adjustments may be made, for example, during shift changes at the curbside branch so as not to unnecessarily disrupt service at the location.

Figure 4:
FIG. 4 shows a curbside branch operational interface for several curbside branches deployed in a geographic area over a number of shifts.

In some implementations, a dashboard may be provided that shows operational information for deployed curbside branches. In some implementations, the dashboard may be provided in a mobile application. In other implementations, the dashboard may be presented as shown in the example shown in FIG. 4. FIG. 4 shows an example curbside branch operational dashboard interface for several curbside branches deployed in a geographic area over a number of shifts. Such an operational dashboard may be used, for example, by an operations manager, or someone in charge of managing the deployment of curbside branches based on metrics and predictions described herein. The operational dashboard shows a map view of the predicted most in-demand locations where customers may be located, given the time of day. With this information, the operations manager can send out the recommended number of curbside branches to deploy to best serve customers.

In some implementations, the circles shown on the map are either larger or smaller depending on the number of people expected to be in a particular geographic location or region.

As shown in FIG. 4, the operational dashboard can show a variety of information about the deployed curbside branches, including the actual and predicted number of visitors at each of the curbside branches. The dashboard further shows the capacity for the particular branch. As further shown in FIG. 4, the operational dashboard may be divided by time shifts, with each shift having a graph (e.g., a bar chart), a curbside branch count, and a services box.

As shown in FIG. 4, the actual visitor, predicted visitor, and branch capacity numbers can be displayed in a bar chart for ease of review. The bar chart represents the number of people expected to visit, the branch capacity, and the actual number of people who visited in a specific region of the dashboard. This information may assist the operations manager to understand how region is being serviced. For example, if the branch capacity does not exceed the predicted number of customers, then an additional curbside branch may be deployed to handle the demand.

The operational dashboard can further show information such as the number of deployed curbside branches, the locations of each of the curbside branches (e.g., on a map), the services provided at each of the curbside branches, and the languages offered at each of the curbside branches. The services box represents the custom services that may be required in that region to best address the needs of customers. For example, it may be determined that a particular region requires Chinese-speaking attendants to best serve Chinese-speaking customers in that region.

The operational dashboard may further show the information about the curbside branches during different shifts (e.g., Shift 1 from 8 AM to 11 AM, Shift 2 from 11 AM to 2 PM, Shift 3 from 2 PM to 5 PM, and Shift 4 from 5 PM to 8 PM). By displaying the information about the curbside branches by shift rather than, for example, over an entire day, greater granularity can be provided so that specific adjustments can be made to accommodate for greater than or less than anticipated demand.

Figure 5:
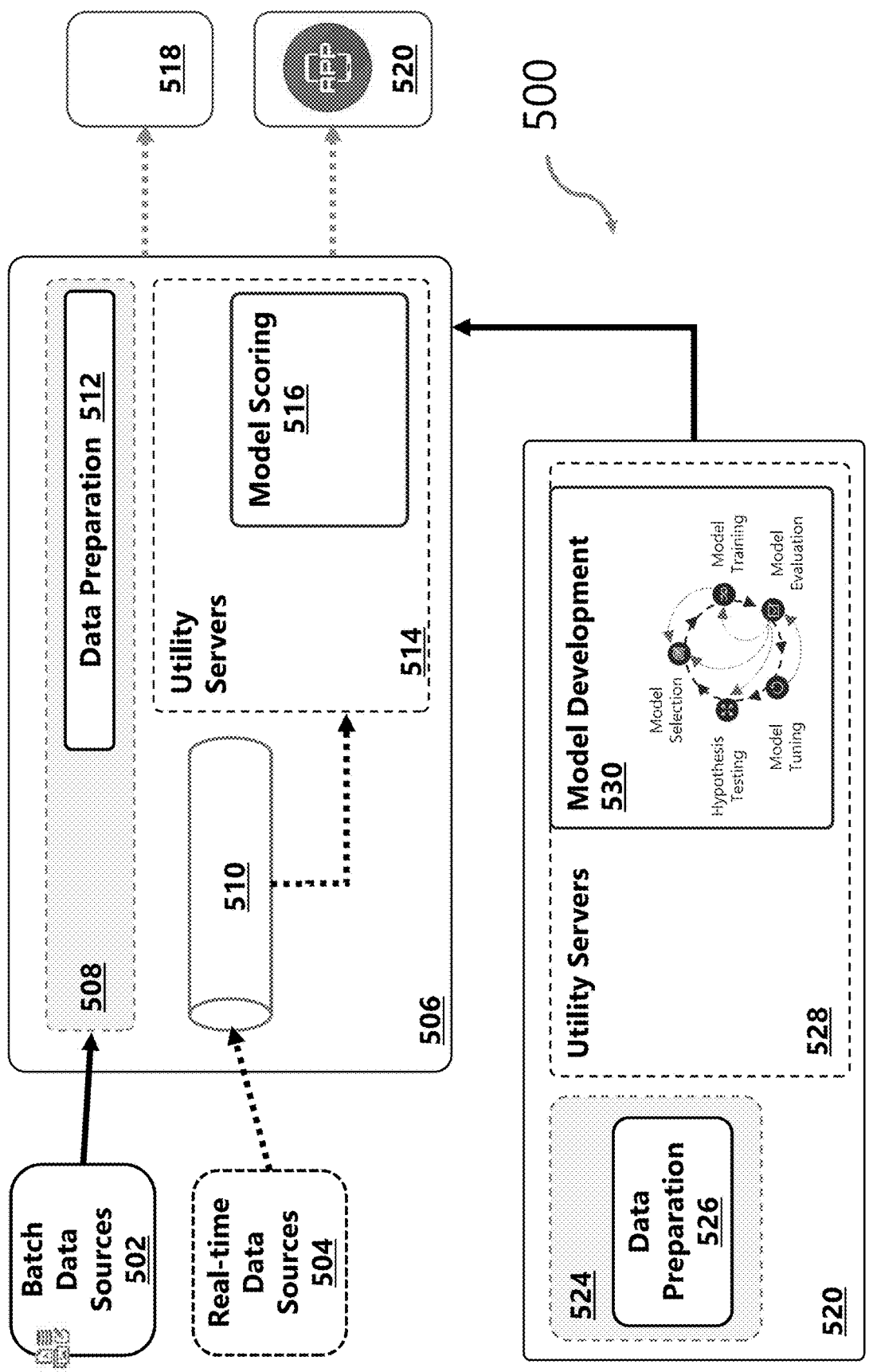
FIG. 5 shows a block diagram illustrating an example system for determining a location of a curbside branch.

FIG. 5 shows a block diagram illustrating an example system 500 for determining a location of a curbside branch. The system includes batch data sources 502 and real-time data sources 504 that feed data to an enterprise data platform 506. As indicated by the solid line, the batch data sources may transmit data in a batched matter, while the real-time data sources may transmit data in real-time, as represented by the dotted line. The enterprise data platform 506 includes a computational cluster 508, event streaming platform 510, and one or more utility servers 514.

The computational cluster 508 may be, for example, a Hadoop cluster that is designed for storing and analyzing huge amounts of unstructured data in a distributed computing environment. The computational cluster 508 further includes a data preparation module 512 for preparing various types of batch data for further processing. The event streaming platform may comprise, for example, Apache Kafka®.

The one or more utility servers 514 includes a model scoring module 516 for determining a score based on one or more models. The one or more utility servers 514 may further optionally include one or more GPU or CPU servers (not shown). In some implementations, the utility servers run GPU accelerated Deep Learning Algorithms.

Data from the enterprise data platform 506 may be transmitted to software 518 (e.g., Tableau®) and one or more downstream applications 520 for further analysis or processing.

A data platform 520 transmits model data to the enterprise data platform 506. The data platform 520 includes a computational cluster 524 and one or more utility servers 528. The one or more utility servers 528 may comprise GPU/CPU compute nodes (e.g., servers).

The computational cluster 524 may be, for example, a Hadoop-based data storage that is designed for storing and analyzing huge amounts of unstructured data in a distributed computing environment. The computational cluster 524 further includes a data preparation (development) module 526 for performing analytics and/or model development, including data discovery, data preparation, feature engineering, model development, delivery, and consumption. Data discovery comprises interacting with and exploring the data, and performing basic descriptive statistics and pattern detection via a wide variety of exploratory steps and visualization options. Data preparation includes collecting data from different sources, including preprocessing, transformation, normalization, and cleaning of data in preparation for feature engineering. Feature engineering attempts to create relevant business features from the existing raw data elements to improve the power of the learning algorithm and filter features to reduce the dimensionality of the training problem. Model development comprises the selection, training, and execution of the machine-learning routines, including evaluation and optimization of the models. The model development life cycle provides a framework for implementing continuous development, testing, training, and evaluating models. During delivery, the artifacts created during data preparation, feature engineering, and model development are packaged and deployed to production. During consumption, the model outcomes, including scoring and serving, can be co-located in the utility server and/or in an application, or decoupled across the utility server and application.

The one or more utility servers 528 includes a model development module 530 for developing a model that can be applied to the enriched historical and current transaction data. The model development module 530 can perform model training, model evaluation, model tuning, hypothesis testing, and model selection.

The data platform 520 then transmits the developed model to the enterprise data platform 506 where the one or more utility servers 514 perform model scoring 516 on the received data from the batched data sources 502 and real-time data sources 504 using the models developed by the model development module 530.

The results of the application of the model can then be sent to software 518 and one or more downstream applications 520 for further analysis or processing. In some implementations, the data is sent by the enterprise data platform 506, after which a curbside branch is automatically deployed. In other implementations, the data is sent by the enterprise data platform 506 to a remote entity for further approval before deployment of a curbside branch.

While portions of the elements illustrated in FIG. 5 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 6A:
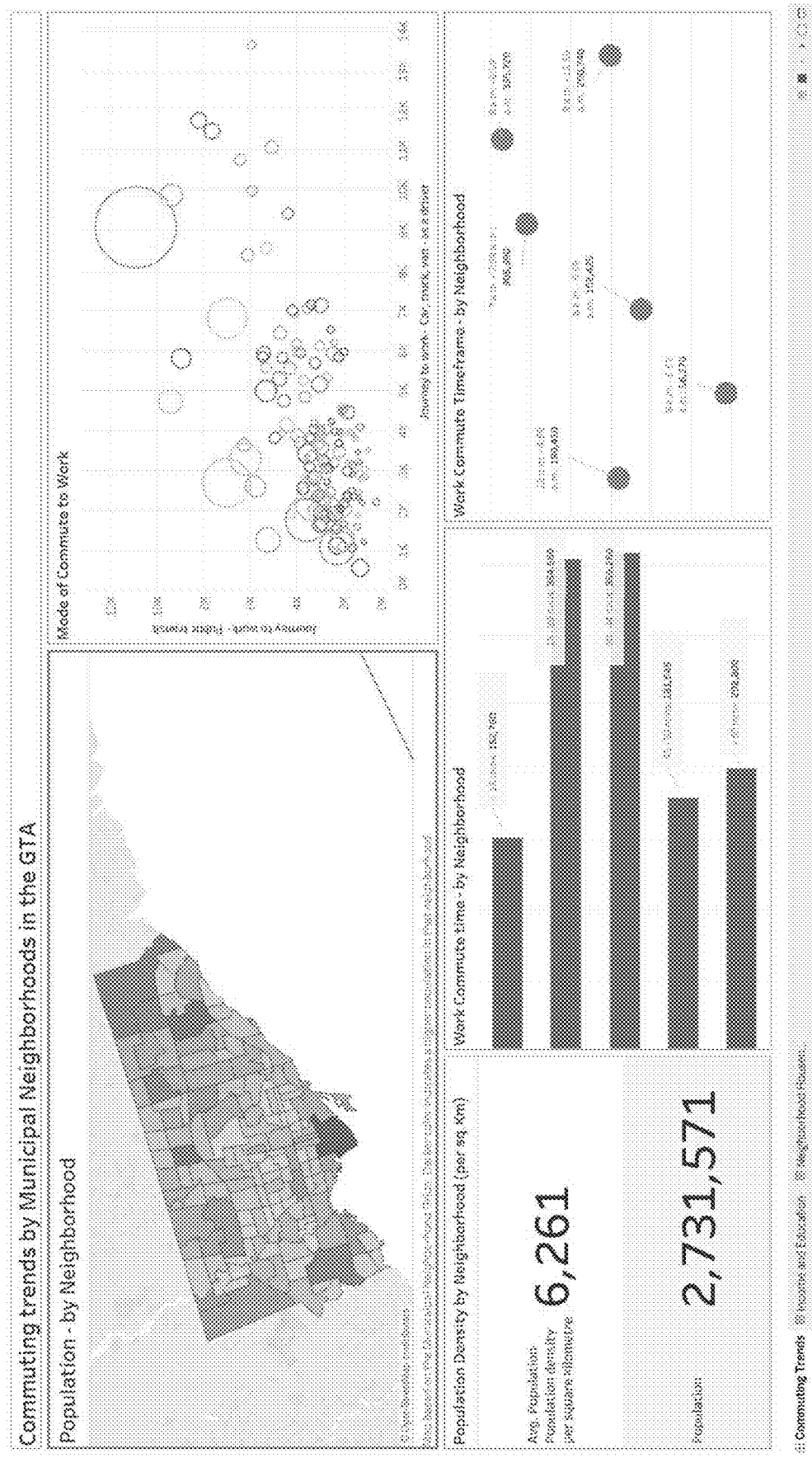
FIGS. 6A-6C show a visual representations of example external data that may be used to enrich the historical and current transaction data.
Figure 6B:
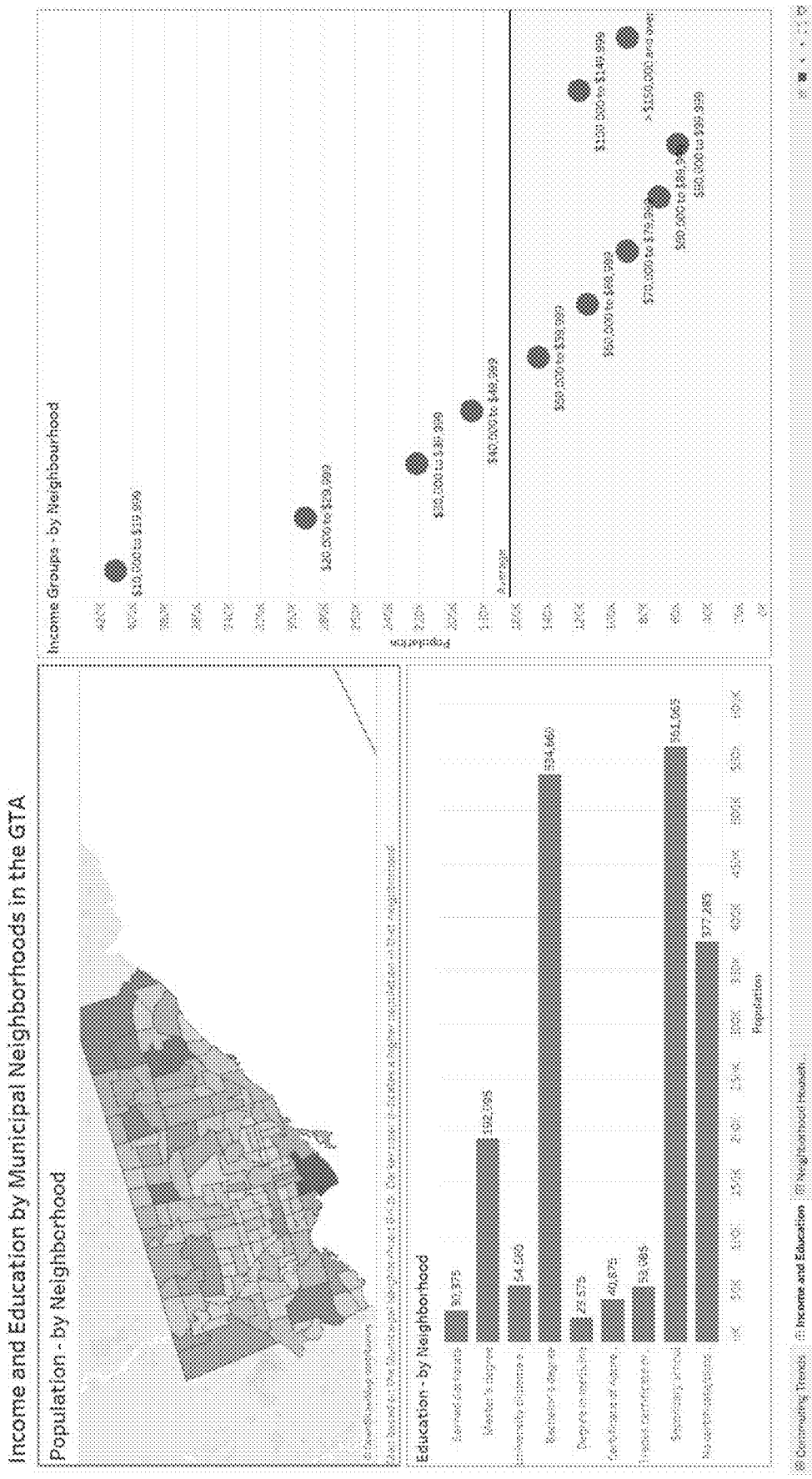
Figure 6C:
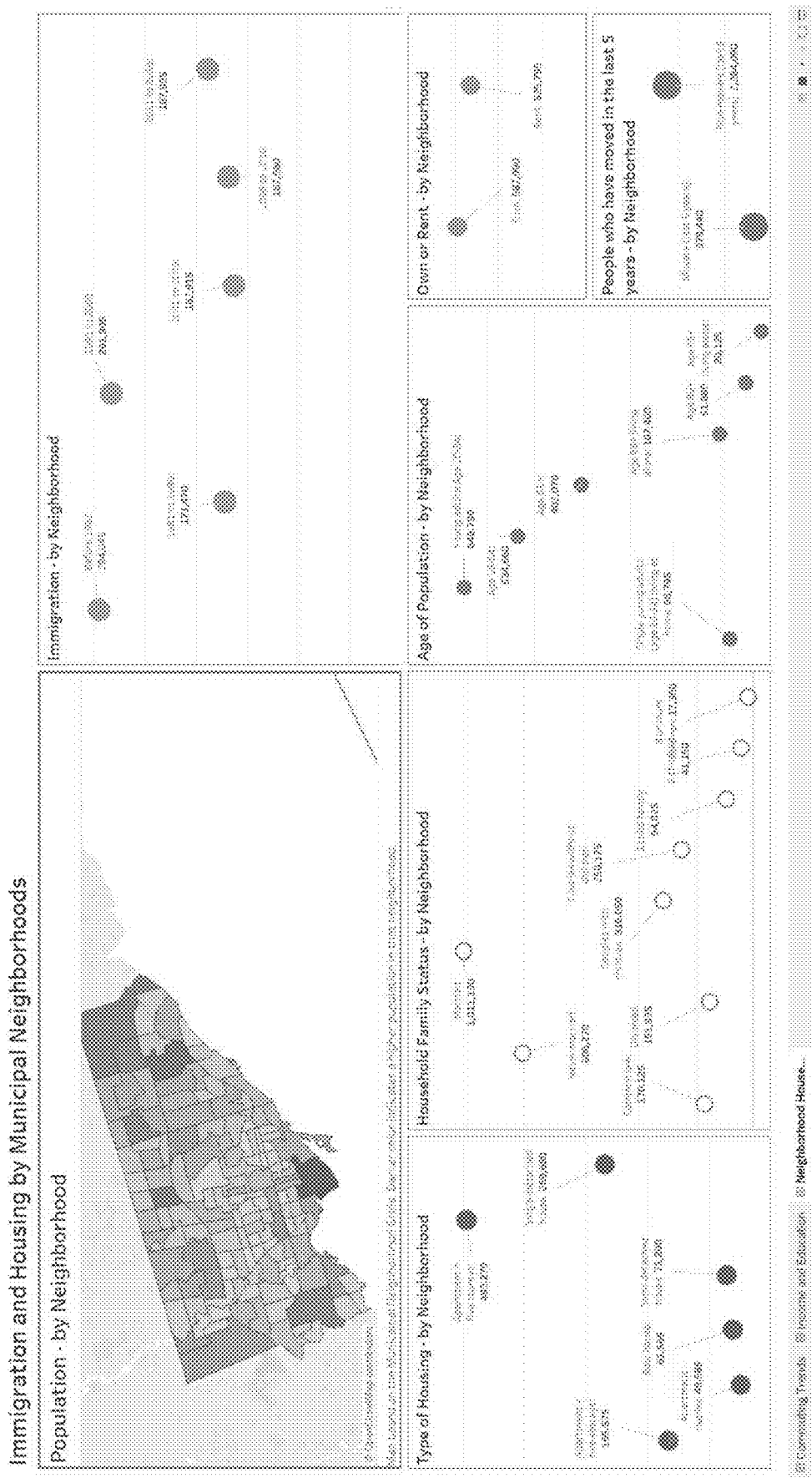

As noted above, various types of external data may be used to enrich the historical and current transaction data. FIGS. 6A-6C show visual representations of example external data for enriching the historical and current transaction data. The external data shown in FIG. 6A includes external data relating to commuting trends, including population by area, modes of commute to work (e.g., by car, truck, or van), population density by neighborhood, work commute time by neighborhood, and work commute timeframe by neighborhood. FIG. 6B shows external data about income and education, including population by neighborhood, education by neighborhood, and income groups by neighborhood. FIG.

6C shows external data about immigration and housing, including population by neighborhood, type of housing by neighborhood, household family status by neighborhood, immigration by neighborhood, age of population by neighborhood, whether residents own or rent by neighborhood, and people who have moved in the last 5 years by neighborhood.

Figure 7:
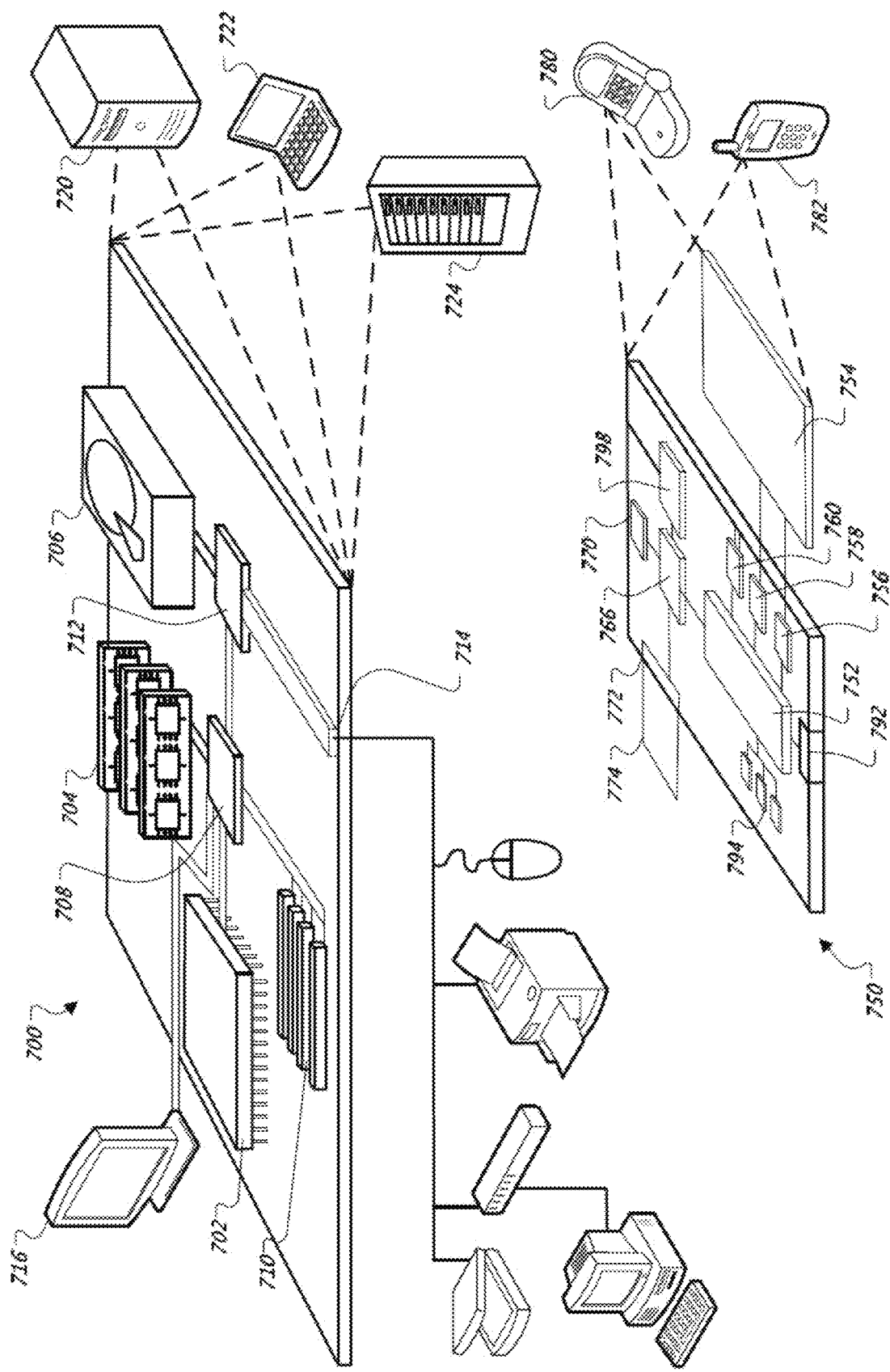
FIG. 7 shows an example of a computer device and a mobile computer device that can be used to implement the techniques described here.

FIG. 7 shows an example of a computer device 700 and a mobile computer device 750 that can be used to implement the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube), LCD (liquid crystal display), or TFT monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The preceding figures and accompanying description illustrate example processes and computer-implementable techniques. However, system 100 or system 500 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure.

Other changes, substitutions, and alterations are also possible without departing from the spirit and scope of this disclosure.

What is claimed is:

1. A system comprising:
at least one memory storing instructions; and
at least one hardware processor interoperably coupled with the at least one memory, wherein the instructions instruct the at least one hardware processor to:
obtain historical data and current exchange data of customers of a financial institution associated with a particular location;
obtain external data about the particular location, the external data comprising at least one of demographic data, commute-related information, seasonal information, local information, event information, or geo-location-related information;
enrich, as enriched data, the historical data and the current exchange data with the external data, wherein the enrichment includes:
merging the historical data and the current exchange data with the external data; and
deriving insights of customer demands for financial services associated with the particular location;
identify one or more analysis rules to apply to the enriched data to determine an estimated demand for the financial services associated with deployment of a mobile site of the financial institution at the particular location;
compare the estimated demand to a predetermined threshold;
in response to a determination that the estimated demand exceeds the predetermined threshold, trigger the deployment of the mobile site at the particular location;
detect that a customer enters an area around the mobile site at the particular location using location-related data provided by a device that includes a Global Positioning System (GPS) receiver; and
in response to detecting that the customer enters the area around the mobile site at the particular location, transmit a notification to the customer to inform the customer about the mobile site and a particular financial service that is featured at the mobile site.

2. The system of claim 1, wherein the estimated demand comprises an aggregate score based on two or more individual factors, the two or more individual factors comprise a population density and per capita demand.

3. The system of claim 1, wherein the historical data and current exchange data comprises financial exchange data and user location data.

4. The system of claim 1, wherein the historical data and current exchange data comprises customer density at the particular location, data exchanges performed by customers within an area surrounding the particular location, mobile location data, and interactions with financial institutions.

5. The system of claim 1, wherein:
the external data comprises dominant languages within an area surrounding the particular location,
the instructions instruct the at least one hardware processor to:
determine one or more service languages offered at the mobile site of the financial institution based at least on the dominant languages, and
the deployment of the mobile site at the particular location comprises deploying the mobile site offering the one or more service languages at the particular location.

6. The system of claim 1, wherein:
the external data comprises market conditions,
the instructions instruct the at least one hardware processor to:
determine one or more types of financial services offered at the mobile site of the financial institution based at least on market conditions, wherein the types of financial services comprise withdrawals, deposits, and requests for increased credit limits or borrowing, and
the deployment of the mobile site at the particular location comprises deploying the mobile site offering the one or more types of financial services at the particular location.

7. The system of claim 1, wherein the external data comprises one or more pieces of information about residents and persons who visit an area surrounding the particular location, work hours in the area surrounding the particular location, income and education information about persons in the area surrounding the particular location, event information in the area surrounding the particular location, weather information in the area surrounding the particular location, or market conditions.

8. The system of claim 1, wherein the one or more analysis rules is selected from a group consisting of machine learning rules and neural network based rules.

9. The system of claim 1, wherein applying the one or more analysis rules comprises performing person analysis, event analysis, and density analysis.

10. The system of claim 1, wherein the instructions further instruct the at least one hardware processor to cause the mobile site to be automatically dispatched.

11. The system of claim 1, wherein the instructions further instruct the at least one hardware processor to:
modify hours of operation for the mobile site based on updated or analyzed information.

12. The system of claim 1, wherein the predetermined threshold is a predetermined value.

13. The system of claim 1, wherein the predetermined threshold is dynamically defined to determine when a mobile site is to be deployable.

14. The system of claim 1, wherein the deployment of the mobile site at the particular location is further in response to a determination that a population density of the particular location exceeds a predetermined population density threshold.

15. The system of claim 1, wherein the instructions further instruct the at least one hardware processor to:
predict targeted services to be provided by the mobile site at the particular location based on demand information.

16. The system of claim 1, wherein the instructions further instruct the at least one hardware processor to:
determine a time period during which to deploy the mobile site based at least on the enriched data.

17. A non-transitory, computer-readable medium storing computer-readable instructions executable by a computer and configured to instruct the computer to:
obtain historical data and current exchange data of customers of a financial institution associated with a particular location;
obtain external data about the particular location, the external data comprising at least one of demographic data, commute-related information, seasonal information, local information, event information, or geo-location-related information;
enrich, as enriched data, the historical data and the current exchange data with the external data, wherein the enrichment includes:
  merging the historical data and the current exchange data with the external data; and
  deriving insights of customer demands for financial services associated with the particular location;
identify one or more analysis rules to apply to the enriched data to determine an estimated demand for the financial services associated with deployment of a mobile site of the financial institution at the particular location;
compare estimated demand to a predetermined threshold;
in response to a determination that the estimated demand exceeds the predetermined threshold, trigger the deployment of the mobile site at the particular location;
detect that a customer enters an area around the mobile site at the particular location using location-related data provided by a device that includes a Global Positioning System (GPS) receiver; and
in response to detecting that the customer enters the area around the mobile site at the particular location, transmit a notification to the customer to inform the customer about the mobile site and a particular financial service that is featured at the mobile site.

18. The non-transitory, computer-readable medium of claim 17, wherein the estimated demand comprises an aggregate score based on two or more individual factors, the two or more individual factors comprise a population density and per capita demand.

19. A computerized method performed by one or more processors, the method comprising:
  obtaining historical data and current exchange data of customers of a financial institution associated with a particular location;
  obtaining external data about the particular location, the external data comprising at least one of demographic data, commute-related information, seasonal information, local information, event information, or geo-location-related information;
  enriching, as enriched data, the historical data and the current exchange data with the external data, wherein the enriching includes:
    merging the historical data and the current exchange data with the external data; and
    deriving insights of customer demands for financial services associated with the particular location;
  identifying one or more analysis rules to apply to the enriched data to determine an estimated demand for the financial services associated with deployment of a mobile site of the financial institution at the particular location;
  comparing estimated demand to a predetermined threshold;
  in response to a determination that the estimated demand exceeds the predetermined threshold, triggering the deployment of the mobile site at the particular location;
  detecting that a customer enters an area around the mobile site at the particular location using location-related data provided by a device that includes a Global Positioning System (GPS) receiver; and
  in response to detecting that the customer enters the area around the mobile site at the particular location, transmitting a notification to the customer to inform the customer about the mobile site and a particular financial service that is featured at the mobile site.

20. The method of claim 19, wherein the estimated demand comprises an aggregate score based on two or more individual factors, the two or more individual factors comprise a population density and per capita demand.

* * * * *